United States Patent
Bonanno

(10) Patent No.: US 11,674,612 B2
(45) Date of Patent: Jun. 13, 2023

(54) VALVE

(71) Applicant: Vitesco Technologies GmbH, Hannover (DE)

(72) Inventor: Rosario Bonanno, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 17/284,096

(22) PCT Filed: Oct. 10, 2019

(86) PCT No.: PCT/EP2019/077448
§ 371 (c)(1),
(2) Date: Apr. 9, 2021

(87) PCT Pub. No.: WO2020/074628
PCT Pub. Date: Apr. 16, 2020

(65) Prior Publication Data
US 2021/0348695 A1    Nov. 11, 2021

(30) Foreign Application Priority Data

Oct. 10, 2018 (DE) .................... 10 2018 217 339.7

(51) Int. Cl.
*F16K 31/06* (2006.01)
*F16K 27/02* (2006.01)

(52) U.S. Cl.
CPC ........ *F16K 31/0655* (2013.01); *F16K 27/029* (2013.01)

(58) Field of Classification Search
CPC ..... F16K 27/029; F16K 31/0655; F02B 37/16
See application file for complete search history.

(56) References Cited

U.S. PATENT DOCUMENTS

| | | | | |
|---|---|---|---|---|
| 5,027,846 A | * | 7/1991 | Baron | ................ F16K 31/0624 251/129.08 |
| 5,897,096 A | * | 4/1999 | Nakano | ................ F16K 41/103 251/65 |
| 2003/0116739 A1 | | 6/2003 | Murao et al. | |

(Continued)

FOREIGN PATENT DOCUMENTS

| | | |
|---|---|---|
| CN | 101737550 | 6/2010 |
| CN | 102209654 | 10/2011 |

(Continued)

OTHER PUBLICATIONS

International Search Report issued in corresponding PCT Application PCT/EP2019/077448.

(Continued)

*Primary Examiner* — Matthew W Jellett
(74) *Attorney, Agent, or Firm* — Cozen O'Connor

(57) ABSTRACT

A valve includes: a housing; a solenoid arranged in the housing; a pin movable by the solenoid; and a pot-shaped piston connected to the pin. The solenoid has a coil body having a central opening, an upper stator arranged in the central opening, and a lower stator configured to receive the coil body. The pin is mounted in first and second bearings arranged in the upper stator and a bushing, respectively. A guide sleeve is arranged at least in the central opening of the coil body, and the upper stator and the bushing are arranged in the guide sleeve.

8 Claims, 2 Drawing Sheets

(56) References Cited

U.S. PATENT DOCUMENTS

| | | | | |
|---|---|---|---|---|
| 2008/0197958 | A1* | 8/2008 | Bielass | H01F 41/125 |
| | | | | 336/92 |
| 2010/0123535 | A1* | 5/2010 | Yamagata | H01F 7/081 |
| | | | | 335/260 |
| 2013/0264507 | A1 | 10/2013 | Schnelker et al. | |
| 2013/0313455 | A1* | 11/2013 | Bittner | F16K 31/0658 |
| | | | | 251/129.15 |
| 2017/0159842 | A1 | 6/2017 | Chen et al. | |
| 2017/0261113 | A1* | 9/2017 | Sato | B60T 15/36 |

FOREIGN PATENT DOCUMENTS

| | | |
|---|---|---|
| CN | 106574736 | 4/2017 |
| DE | 10 2009 046 659 | 7/2010 |
| DE | 10 2012 204 565 | 9/2013 |
| DE | 10 2017 202 511 | 6/2018 |
| EP | 2 730 825 | 5/2014 |
| JP | 2003-074734 | 3/2003 |
| JP | 2003-185051 | 7/2003 |
| JP | 2010-117009 | 5/2010 |
| JP | 2017-527757 | 9/2017 |
| WO | WO 2019/121533 | 6/2019 |

OTHER PUBLICATIONS

Written Opinion issued in corresponding PCT Application PCT/EP2019/077448.

Office Action issued in corresponding DE Application No. 10 2018 217 339.7 dated Nov. 13, 2018.

Office Action issued in corresponding DE Application No. 10 2018 217 339.7 dated Jan. 25, 2021.

Office Action dated Mar. 8, 2022 issued in Japanese Patent Application No. 2021-519787.

Office Action dated Jul. 21, 2021 issued in Chinese Patent Application No. 201980066436.1.

* cited by examiner

VALVE

CROSS REFERENCE TO RELATED APPLICATIONS

This is a U.S. national stage of International application No. PCT/EP2019/077448, filed on Oct. 10, 2019, which claims priority to German Application No. 10 2018 217 339.7, filed Oct. 10, 2018, the content of each of which is incorporated herein by reference.

BACKGROUND OF THE INVENTION

1. Field of the Invention

The invention relates to a valve having a solenoid, arranged in a housing, a pin movable by the solenoid and a piston connected to the pin.

2. Description of the Prior Art

Such valves are used, inter alia, as a recirculation dump valve on the turbocharger in motor vehicles to open up a bypass to the suction side in overrun operation, and are thus known. In order to prevent excessive deceleration of the turbocharger but also ensure rapid run-up, rapid opening and closing of the valve are essential prerequisites, by virtue of the pin and the piston connected thereto being moved into the open position or closed position of the valve. For this purpose, the pin is mounted in two bearings. Owing to manufacturing and assembly tolerances, coaxiality of the two bearings arises, leading to increased friction. To compensate this, a greater magnetic force and a stronger spring are required for moving the pin, which requires components of larger dimensions along with increased consumption of electrical energy. Furthermore, higher magnetic radial forces act on the pin, which, in the case of a relatively long operating duration of the valve, can lead to a blockage.

SUMMARY OF THE INVENTION

It is an object of the invention to create a valve that allows easy opening and closing of the valve. The valve should furthermore be inexpensive.

The object may be achieved by providing a valve having a housing, having a solenoid arranged in the housing, having a pin which is movable by the solenoid and having a pot-shaped piston which is connected to the pin, wherein the solenoid has at least one coil body, an upper stator which is arranged in the central opening of the coil body, and a lower stator which receives the coil body, and the pin is mounted in two bearings, wherein one bearing is arranged in the upper stator and the other bearing is arranged in a bushing. Further, a guide sleeve is arranged at least in the central opening of the coil body, and the upper stator and the bushing are arranged in the guide sleeve.

The valve according to an aspect of the invention is distinguished by the provision of the guide sleeve that receives the upper stator and the bushing. The guide bushing is a dimensionally stable component that ensures that the upper stator and the bushing are oriented exactly with respect to one another. Since the two components receive in each case one bearing in which the pin is guided, the exact orientation provided by the guide sleeve allows a particularly free movement of the pin for the opening and closing of the valve owing to reduced friction and reduced radial forces. A blockage of the valve is reliably avoided. The thus improved mobility of the pin furthermore allows a reduction in the electrical current consumption of the solenoid, whereby, in a favorable case, the solenoid and thus the valve can be dimensioned to be smaller, such that the valve according to the invention requires less structural space.

Very good dimensional stability of the guide sleeve for the exact orientation of the two bearings may be achieved by the guide sleeve being made of high-grade steel.

It has been found that, in the case of a guide sleeve made of high-grade steel, a wall thickness of 0.4 mm to 1.2 mm, in particular of 0.5 mm to 1 mm, is sufficient for the exact orientation.

According to a further advantageous configuration, a particularly firm connection of the guide sleeve to the coil body can be achieved by virtue of the metallic guide sleeve being placed into an injection-molding tool for generating the coil body and being overmolded with the plastic for the coil body.

In another advantageous configuration, a valve according to an aspect of the invention with a reduced weight can be attained by the guide sleeve being made of plastic.

Sufficient dimensional stability with a low weight is achieved by virtue of the guide sleeve having a wall thickness of 0.8 mm to 1.8 mm, in particular of 1 mm to 1.5 mm.

In a further advantageous configuration, the guide sleeve composed of plastic is injection-molded onto the coil body of the solenoid, that is to say formed integrally with the coil body. With the integral form of coil body and guide sleeve, the number of components can be reduced, which also reduces the outlay on assembly.

BRIEF DESCRIPTION OF THE DRAWINGS

The invention will be described in more detail on the basis of the drawings and an exemplary embodiment. In the drawings.

DETAILED DESCRIPTION OF THE PRESENTLY PREFERRED EMBODIMENTS

Figure 1:
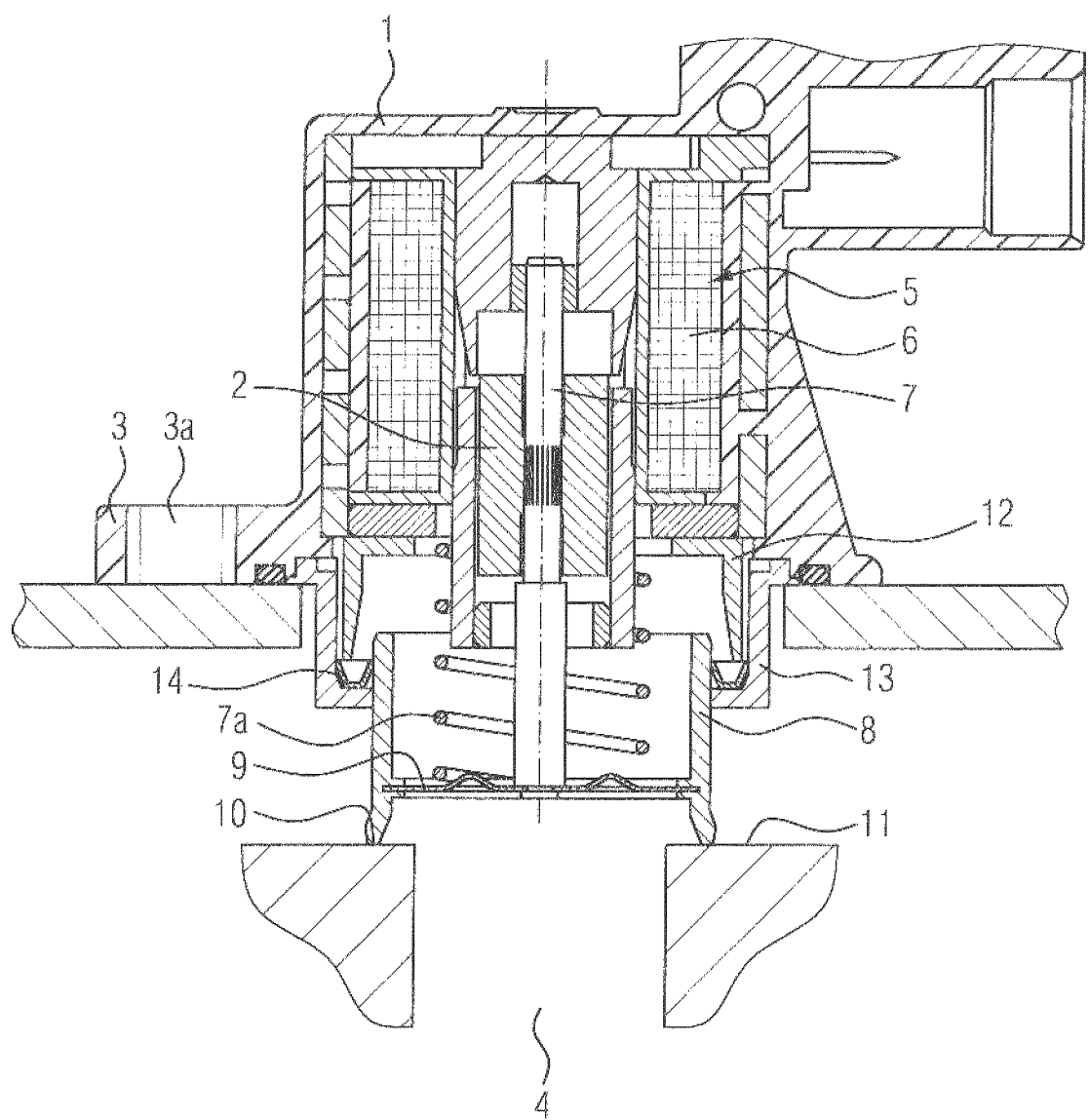
FIG. 1 shows a sectional illustration of a valve according to the prior art.

FIG. 1 shows the valve, which comprises a housing 1. The housing 1 furthermore has an integrally formed flange 3, via which the housing 1 is flanged-mounted on a turbocharger (not illustrated) in the region of a bypass line 4. A solenoid 5 having a coil 6 and a metal pin 7 is arranged in the housing 1. The metal pin 7 is connected to a pot-shaped piston 8, which has a seal 10 at the periphery of its base 9. Here, a spring 7a pushes the piston 8 in the direction of the valve seat 11.

The housing 1 furthermore has a cylindrical section 12 which extends in the direction of the piston 8. A cylinder bushing 13 connected to the housing surrounds the cylindrical section 12. The cylinder bushing 13 has a radially inwardly directed collar, on which a V-shaped seal 14 lies. The end of the cylindrical section 12 holds the seal 14 in position. The inner limb of the seal 14 seals off the piston 8 against the housing 1. If the solenoid 5 is electrically energized, a magnetic force acts on the armature 2, whereby the piston 8 is moved in the direction of the housing 1. Here, the seal 14 seals the piston 8 against the housing 1.

Figure 2:
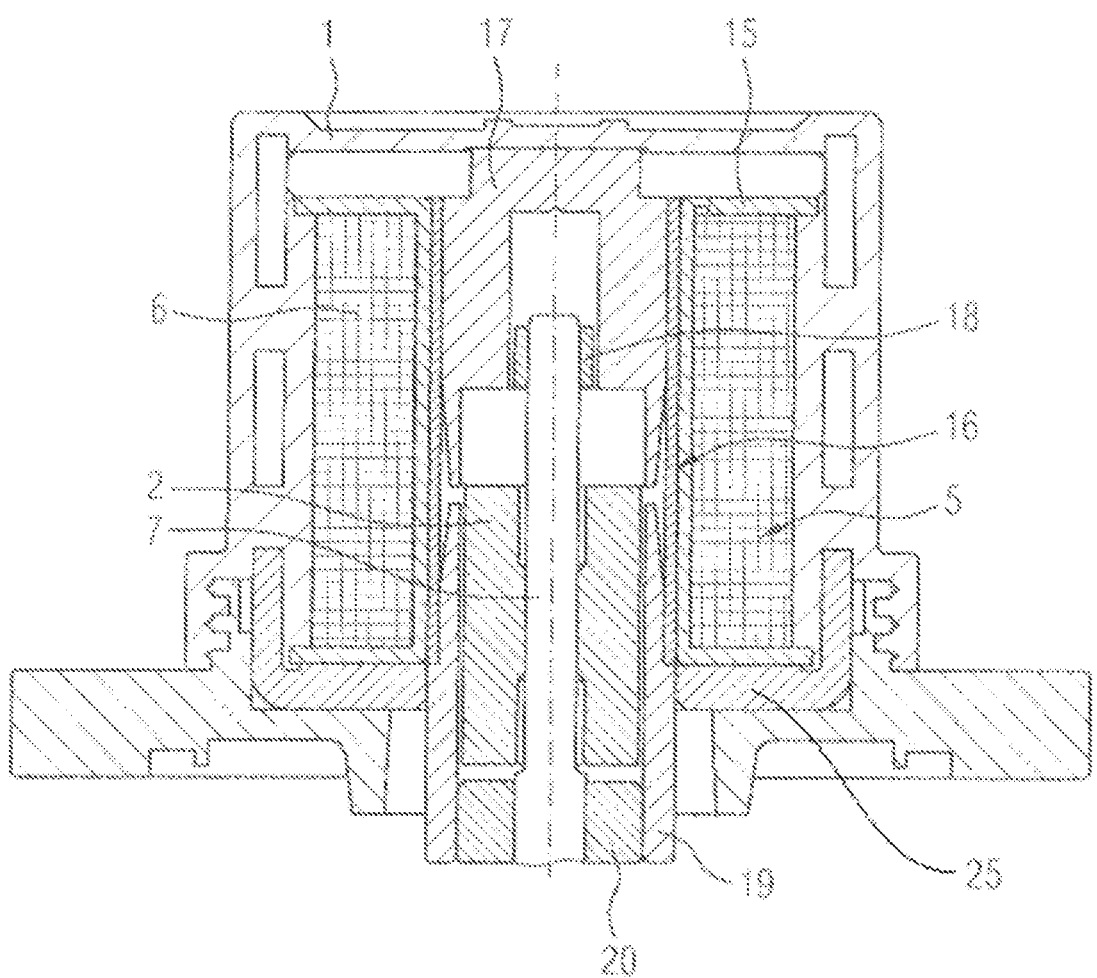
FIG. 2 shows the housing of a valve according to the invention.

FIG. 2 shows the housing 2 with the solenoid 5, which is composed of the coil 6 and the coil body 15. The solenoid 5 has at least one coil body 15, an upper stator 17 which is arranged in the central opening of the coil body 15, and a lower stator 25 which receives the coil body 15. The coil body 15 is composed of plastic and surrounds a guide sleeve 16. The guide sleeve 16 is composed of a high-grade steel with a wall thickness of 0.8 mm. In an installed state, an upper stator 17 is pressed into the upper end of the guide sleeve 16, which upper stator, by way of a central opening, receives a bearing 18 for the pin 7. In the illustration shown, a bushing 19 is pressed in at the lower end of the guide sleeve 16. The second bearing 20 for the pin 7 is arranged in the bushing 19. The guide sleeve 16 ensures that the upper stator 17 and the bushing 19 are oriented coaxially with respect to one another without an offset. In this way, the translational movement of the pin 7 is avoided virtually without disruptive forces caused by an inexact arrangement and orientation of the bearings 18, 20.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

The invention claimed is:

1. A valve comprising:
a housing;
a solenoid arranged in the housing;
a pin movable by the solenoid; and
a pot-shaped piston connected to the pin,
wherein:

the solenoid has a coil body having a central opening, an upper stator arranged in the central opening of the coil body, and a lower stator configured to receive the coil body, the lower stator that is L-shaped, a first leg at least partially radially concentrically surrounds a radially outer circumference of the coil body and a second leg at least partially axially surrounds the coil body, the pin is mounted in first and second bearings, the first bearing being arranged in the upper stator and the second bearing being arranged in a bushing, a guide sleeve is arranged at least in the central opening of the coil body, and the upper stator and the bushing are arranged in the guide sleeve, and the bushing arranged at least in part radially inside the lower stator and the guide sleeve.

2. The valve as claimed in claim 1, wherein the guide sleeve is made of high-grade steel.

3. The valve as claimed in claim 2, wherein the guide sleeve has a wall thickness of 0.4 mm to 1.2 mm, or of 0.5 mm to 1 mm.

4. The valve as claimed in claim 1, wherein the coil body is made of plastic and the guide sleeve is connected to the coil body (15) by overmolding with the plastic of said coil body.

5. The valve as claimed in claim 1, wherein the guide sleeve is made of plastic.

6. The valve as claimed in claim 5, wherein the guide sleeve has a wall thickness of 0.8 mm to 1.8 mm, or of 1 mm to 1.5 mm.

7. The valve as claimed in claim 5, wherein the coil body is made of plastic and the guide sleeve is integral with the coil body.

8. The valve as claimed in claim 1, wherein the upper stator and the lower stator are axially spaced apart from one another defining an axial gap.

* * * * *